US012150481B2

(12) United States Patent
Zominy

(10) Patent No.: US 12,150,481 B2
(45) Date of Patent: Nov. 26, 2024

(54) AEROSOL GENERATING DEVICE

(71) Applicant: JT International SA, Geneva (CH)

(72) Inventor: Claude Zominy, Copponex (FR)

(73) Assignee: JT International S.A. (CH)

( * ) Notice: Subject to any disclaimer, the term of this patent is extended or adjusted under 35 U.S.C. 154(b) by 345 days.

(21) Appl. No.: 17/785,256

(22) PCT Filed: Dec. 18, 2020

(86) PCT No.: PCT/EP2020/087305

§ 371 (c)(1),
(2) Date: Jun. 14, 2022

(87) PCT Pub. No.: WO2021/123369

PCT Pub. Date: Jun. 24, 2021

(65) Prior Publication Data

US 2023/0021401 A1 Jan. 26, 2023

(30) Foreign Application Priority Data

Dec. 19, 2019 (EP) .................................... 19218299

(51) Int. Cl.

| | |
|---|---|
| ***A24F 40/44*** | (2020.01) |
| ***A24F 40/10*** | (2020.01) |
| ***A24F 40/46*** | (2020.01) |
| ***H05B 3/20*** | (2006.01) |

(52) U.S. Cl.

CPC .............. *A24F 40/44* (2020.01); *A24F 40/10* (2020.01); *A24F 40/46* (2020.01); *H05B 3/20* (2013.01); *H05B 2203/021* (2013.01); *H05B 2203/037* (2013.01)

(58) Field of Classification Search
None
See application file for complete search history.

(56) References Cited

U.S. PATENT DOCUMENTS

| | | | |
|---|---|---|---|
| 10,188,144 | B2 | 1/2019 | Dickens et al. |
| 2018/0132532 | A1 | 5/2018 | Batista |

FOREIGN PATENT DOCUMENTS

| | | | | |
|---|---|---|---|---|
| CA | 3063305 A1 | 11/2018 | | |
| EP | 3104724 A1 | 12/2016 | | |
| EP | 3838012 A1 * | 6/2021 | ............. | A24F 40/44 |
| GB | 2529201 A | 2/2016 | | |
| WO | 2019206985 A1 | 10/2019 | | |

OTHER PUBLICATIONS

International Search Report for Application No. PCT/EP2020/087305 mailed Apr. 6, 2021, pp. 1-6.

* cited by examiner

*Primary Examiner* — Tho D Ta
(74) *Attorney, Agent, or Firm* — Lerner David LLP

(57) ABSTRACT

An aerosol generating device includes a planar heating element including a mesh of electrically conductive fibres, a heating rod in contact with a central portion of the planar heating element to provide a central region of high current density, thereby providing a temperature gradient across the planar heating element during use, a liquid store, and a liquid transport element arranged between the liquid store and the planar heating element and configured to transport liquid from the liquid store to the planar heating element under capillary action during use, wherein the liquid transport element is arranged in contact with an edge portion of the mesh.

12 Claims, 6 Drawing Sheets

AEROSOL GENERATING DEVICE

CROSS-REFERENCE TO RELATED APPLICATIONS

The present application is a national phase entry under 35 U.S.C. § 371 of International Application No. PCT/EP2020/087305, filed Dec. 18, 2020, published in English, which claims priority to European Application No. 19218299.6 filed Dec. 19, 2019, the disclosures of which are incorporated herein by reference.

FIELD OF THE INVENTION

The present invention relates to an aerosol generating device or system, such as an electronic cigarette.

BACKGROUND

Aerosol generation devices often use a heating component, aerosol generating device or heater, to heat an aerosol generating liquid in order to generate an aerosol, or vapour, for inhalation by a user. The heating component is typically made of a conductive material which allows an electric current to flow through it when electrical energy is applied across the heating component. The electrical resistance of the conductive material causes heat to be generated as the electric current passes through the material, a process commonly known as resistive heating.

Generally, such devices comprise a liquid store and a liquid transport element or "wick" formed of a capillary material arranged to transport liquid from the liquid store to the heating element. However, in these devices the close proximity of the wick to the heating element leads to the temperature degradation of the wick, thereby reducing the effective lifespan of the device.

In one known type of aerosol generating device, the heating element itself comprises a capillary material, for example a mesh of conducting fibres, such that is provides both the wicking function to transport the aerosol generating liquid from the liquid store and the heating function. However, such heating elements are known to provide inconsistent wicking and variable levels of heating performance, leading to unpredictable aerosol generating properties of the aerosol generating device.

An object of the present invention is therefore to address some of these issues.

SUMMARY

According to the present invention there is provided an aerosol generating device comprising: a planar heating element comprising a mesh of electrically conductive fibres, a heating rod in contact with a central portion of the planar heating element to provide a central region of high current density, thereby providing a temperature gradient across the planar heating element during use, a liquid store, and a liquid transport element arranged between the liquid store and the planar heating element and configured to transport liquid from the liquid store to the planar heating element under capillary action during use, wherein the liquid transport element is arranged in contact with an edge portion of the mesh.

In this way, the heating and liquid transport, i.e. wicking, functions of the aerosol generating device are provided by separate components which allows for the optimisation of each function individually, enhancing wicking properties while maintaining the advantages of a mesh heater. The liquid transport element may be arranged in different configurations, relative to the heating element, according to different device designs. This improves design freedom and increases the range of possible component configurations within the device, enhancing spatial efficiency and allowing for a reduction in the size of the device without impairing its aerosol generating properties. The mesh may be a sintered mesh with a random arrangement of electrically conductive fibres, preferably steel fibres. The electrically conductive fibres may be arranged as a woven fabric, such as a mesh, a non-woven fabric, or a bundle of electrically conductive fibres.

Furthermore, because the planar heating element is configured to provide one or more regions of higher current density, thereby providing a temperature gradient across the planar heating element during use, the temperature gradient across the heating element provides improved transport of liquid via capillary action. Furthermore, the contact portion of the mesh being distanced away from regions of higher current density reduces or avoids the effects of temperature degradation on the liquid transport element. The heating rod and heating element can provide a uniform region of efficient heating, reducing the power required to operate the device as well as the effects of temperature degradation on the liquid transport element.

Preferably, the planar heating element is a flat sheet comprising a mesh of electrically conductive fibres, for example the heating element extends within a single plane.

Preferably, the liquid transport element comprises a wicking component arranged to transport liquid from the liquid store to the heating element.

Preferably the liquid transport element is in contact with the planar heating element, for example the liquid transport element is positioned against an edge of the planar heating element.

In some examples, the liquid transport element provides the sole supply of liquid to the heating element. In other examples liquid transport may be provided both via the liquid transport element and by gaps in the housing of the heating element.

The term aerosol generating device covers a vaporiser, such as a vaporiser for an electronic cigarette. Therefore the term covers both an electronic cigarette containing a vaporiser and a replaceable cartridge containing a vaporiser (known as a "cartomiser").

Preferably, the planar heating element is configured to transport liquid by capillary action in use. In this way the heating element can transport liquid from the liquid transport element to other regions of the heating element, permitting the liquid transport element to be disposed away from the hottest regions of the heating element and thus avoiding temperature degradation of the liquid transport element.

Preferably, the planar heating element comprises slots extending inwardly from an edge of the planar heating element. The slots may be arranged such that the planar heating element comprises a square wave shape, in other words the heating element has a meandering, zig-zag, periodic or serpentine shape, or that the heating element preferably follows a serpentine/meandering path in the plane of the heating element. In this way, a meandering current path may be provided as electrical current travels along the heating element, resulting in different concentrations of current along the length of the heating element. In use, areas of relatively high current density will become hotter than areas of relatively low current density, thus establishing a temperature gradient across the heating element. The temperature distribution of the heating element can therefore be controlled by varying the structure of the heating element such that the current flows along a meandering or square-wave pattern between two electrical contact points of the heating element.

Preferably, the liquid transport element comprises a first wicking material and a second wicking material, wherein the first wicking material has a higher thermal resistance than the second wicking material. In this way, the liquid transport element can be optimised for the wicking function while avoiding temperature degradation by arranging regions of the first wicking material closer to the areas of higher current density than regions of the second wicking material are to the areas of higher current density. For example the first wicking material may comprise a porous or fibrous metal or ceramic and the second wicking material may comprise cotton or silica.

Preferably, the liquid transport element comprises cotton or a porous ceramic. Preferably, the liquid transport element comprises a ceramic and the mesh is arranged on or embedded in the ceramic such that liquid is transported to the mesh through the ceramic. In this way, the porous ceramic allows for transport of liquid to the heating element in addition to improving the efficiency of the heating operation and aerosol generation. Furthermore, the size of the aerosol generating device may be reduced using this configuration.

Preferably, the liquid transport element is arranged in contact with an edge portion of the mesh. In this way, liquid can be transported to the mesh while ensuring that the liquid transport element is provided at sufficient distance from the heating element to avoid temperature degradation.

Preferably, the liquid transport element is in contact with a plurality of contact portions of the mesh. In this way, the transportation of liquid to the heating element can be calibrated to correspond with the geometry of the heating element, improving the wicking function.

Preferably the aerosol generating device comprises a heater housing arranged to hold the planar heating element within the heater housing; wherein the heater housing comprises a gap providing a liquid flow route between the liquid store on the outside of the heater housing and the heating element within the heater housing; wherein the liquid transport element is positioned within the gap in the heater housing. Preferably a portion of the planar heating element is held within the gap.

Preferably, the aerosol generating device may further comprise: a tubular heater housing having one or more longitudinal gaps running along the length of the heater housing; wherein the liquid store surrounds the tubular heating housing; the planar heating element runs axially through the surrounding heater housing; and one or more liquid transport elements are positioned within the longitudinal gaps and arranged to transport liquid from the liquid store through the gaps in the heater housing to the planar heating element. In this way, the one or more liquid transport elements can act as a wick and draw liquid from the liquid store surrounding the housing into the mesh. The size of the gap and the one or more liquid transport elements may be controlled to such that an edge of the liquid transport element is positioned within the gap or just outside of the gap (i.e. beyond the outer boundary of the housing). Additionally, positioning the liquid transport element in the gap between the heating element and the liquid store prevents the mesh heater becoming overly saturated with the liquid. Furthermore, this enables the aerosol generating device to be provided in a compact configuration while optimising the heating and liquid transport functions of the device.

In a further aspect of the invention there is provided an electronic cigarette comprising the aerosol generating device defined in the claims.

In a further aspect of the invention there is provided a removable cartridge for an electronic cigarette, the cartridge comprising the aerosol generating device defined in the claims.

BRIEF DESCRIPTION OF THE DRAWINGS

Embodiments of the invention are now described, by way of example, with reference to the drawings, in which.

DETAILED DESCRIPTION

Figure 1:
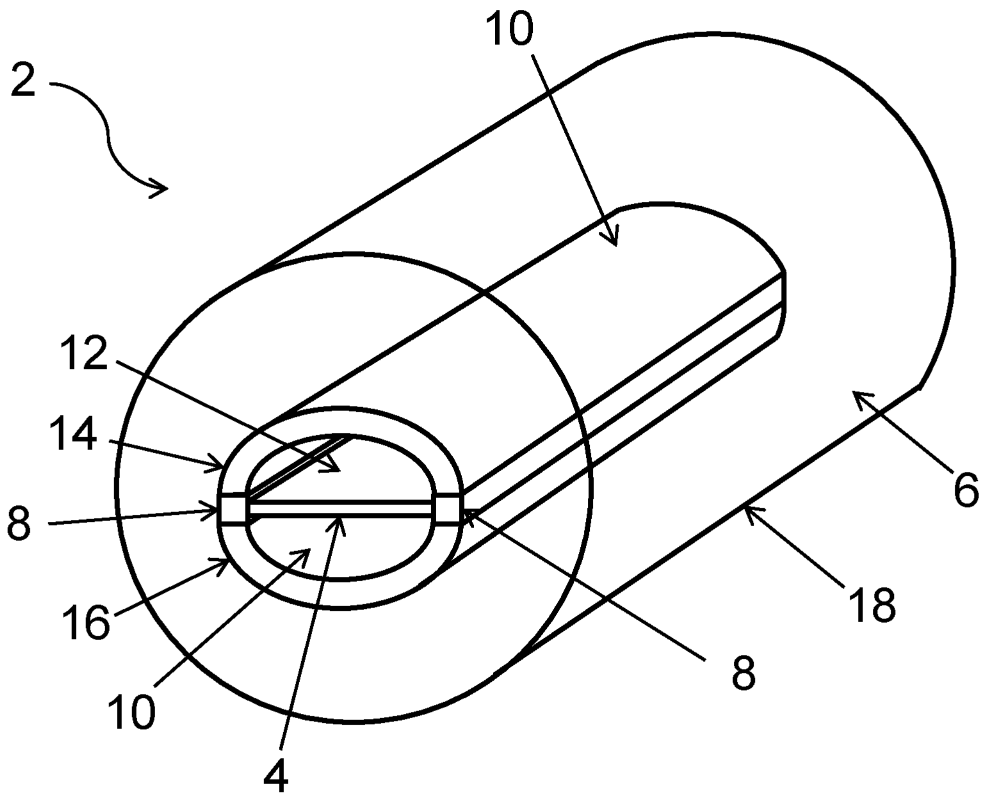
FIG. 1 is a schematic view of an aerosol generating device according to an embodiment of the invention.

FIG. 1 shows an aerosol generating device 2 in an embodiment of the invention which comprises a heating element 4, a liquid store 6, liquid transport elements 8, and a housing 10. The aerosol generating device further comprises a power source, such as a battery, and a mouthpiece which are not shown. In some examples, the aerosol generating device 2 may be, or may be comprised in, a replaceable cartridge or consumable.

In use, the heating element 4 is arranged to receive electrical energy from the battery in order to generate an aerosol by heating an aerosol generating liquid through resistive heating. The liquid transport elements 8 are arranged between the liquid store 6 and the heating element 4 and are configured to transfer the aerosol generating liquid from the liquid store 6 to the heating element 4 by capillary action. In this example, the liquid store 6 is disposed between the housing 10 and an outer casing 18 of the aerosol generating device 2 and is configured to hold the aerosol generating liquid. One or more air flow channels 12 are provided in the housing 10, and configured to, on user inhalation, direct air from outside the aerosol generating device 2 through the air flow channels 12 and toward the mouthpiece of the aerosol generating device. This means that aerosol that has been generated by heating aerosol generating liquid on the heating element 4 will be carried along the air flow channel 12 to exit the device.

The heating element 4 comprises a mesh of electrically conductive fibres. In this embodiment, the mesh is planar with a thickness many times smaller than its length of breadth. The skilled person will appreciate that alternative arrangements electrically conductive fibres may also be used which are not flat or planar. For example, the mesh may be folded, warped, or resemble a rod-like heating element. The fibres form a porous network, thereby providing the heating element 4 with wicking properties.

The fibres of the heating element 4 may be made of a metal, such as stainless steel, non-stainless steel, iron, copper, tungsten, aluminium, brass, Nichrome, Kanthal, Cupronickel and other alloys, or any other metal (element, compound or alloy). Alternatively, the fibres may be made of a non-metal material such as molybdenum disilicide, silicon carbide and other ceramics or semiconductors, or any other non-metal.

In one example, the heating element 4 may comprise a sintered mesh with a random arrangement of fibres. In another example, the heating element 4 may comprise a regular woven pattern of fibres.

The aerosol generating device 2 and housing 10 are substantially cylindrical. Thus, as will be used herein, the "length" of the aerosol generating device 2 or housing 10 refers to the direction parallel to the axis of the cylinder, i.e. the dimension in which the aerosol generating device 2 or housing 10 is elongated. Similarly, the "length" of the heating element 4 refers to its elongate axis which points along the cylindrical axis of the housing 10. The term "lateral" refers to the direction perpendicular to the "length". The skilled person will appreciate that the aerosol generating device 2 and housing 10 are not limited to be cylindrical, and may be formed in many other shapes, with the "length" being defined by the most elongated dimension.

The heating element 4 is mounted in the housing 10. The housing 10 includes a first housing portion 14 placed above the top major side of the heating element 4 and a second housing portion 16 placed below the lower major side of the heating element 4 such that the heating element 4 is disposed between the two housing portions 14, 16. The housing 10 acts as a vaporisation chamber which is configured to collect generated aerosol within the inner spaces of the two housing portions 14, 16.

The edge portions of the first and second housing portions 14, 16 form a gap or interface along the longitudinal length of the housing 10. The liquid transport elements 8 are positioned within these gaps and hold the heating element 4 between them. A portion of each of the liquid transport elements 8 are exposed to the liquid store such that the liquid transport elements 8 act as capillary wicks for transporting liquid to the heating element 4. This configuration allows aerosol generating liquid from the liquid store 6 to be uniformly and reliably supplied to the heating element 4 along its length while preventing the heating element 4 from being flooded with aerosol generating liquid. Wicking properties of the heating element 4 allow liquid to be further drawn across the mesh through capillary action.

In some embodiments of the invention, the liquid transport element 8 fills the gap between the first and second housing portions 14, 16 such that aerosol generating liquid is transported from the liquid store 6 to the heating element 4 solely by the liquid transport element 8, for example by capillary action. In alternative embodiments, the liquid transport element 8 is arranged such that it does not span the full span of the gap between the first and second housing portions 14, 16. This results in aerosol generating liquid being transported from the liquid store 6 to the heating element 4 by the liquid transport element 8 and the opening between the liquid transport element 8 and the first and/or second housing portions 14, 16.

In one example, the edges of the liquid transport elements 8 may extend beyond the outer limits of the housing 10. In an alternative example, the edges of the liquid transport elements 8 may be level or retracted from the outer limits of the housing 10, and aerosol generating liquid from the liquid store 6 configured to penetrate within the gaps between first and second housing portions 14, 16. In either case, portions of the liquid transport elements are in direct fluid communication with the liquid store 6, such that the liquid transport elements 8 determine the transport of liquid to the heating element 4.

The liquid transport elements 8 may be formed for example by a bundle of fibres such as cotton fibres or another porous structure such as ceramic. The embodiment of FIG. 1 comprises two liquid transport elements 8 though the skilled person will recognise that other embodiments of the invention may comprise one or more than two liquid transport elements 8.

Configuring the aerosol generating device 2 with a heating element 4 and liquid transport elements 8 arranged in this manner allows for the properties of each component to be optimised. More specifically, as the liquid transport element 8 is responsible for transporting aerosol generating liquid to the heating element 4 the design of the heating element 4 can be focussed on its heating and aerosol generation. Furthermore, the wicking properties provided by the fibre mesh of the heating element 4 allow for liquid to be transported throughout the heating element 4 while keeping the liquid transport element 8 away from the hottest regions of the heating element 4, thereby reducing the effects of temperature degradation.

Temperature degradation can be further negated by including a plurality of materials with different thermal resistance in different regions of the liquid transport elements 8. For example, a material with a relatively high thermal resistance may be disposed in regions of the liquid transport element 8 that are in close proximity to the heating element 4 or higher temperature areas of the heating element 4.

Figure 2:
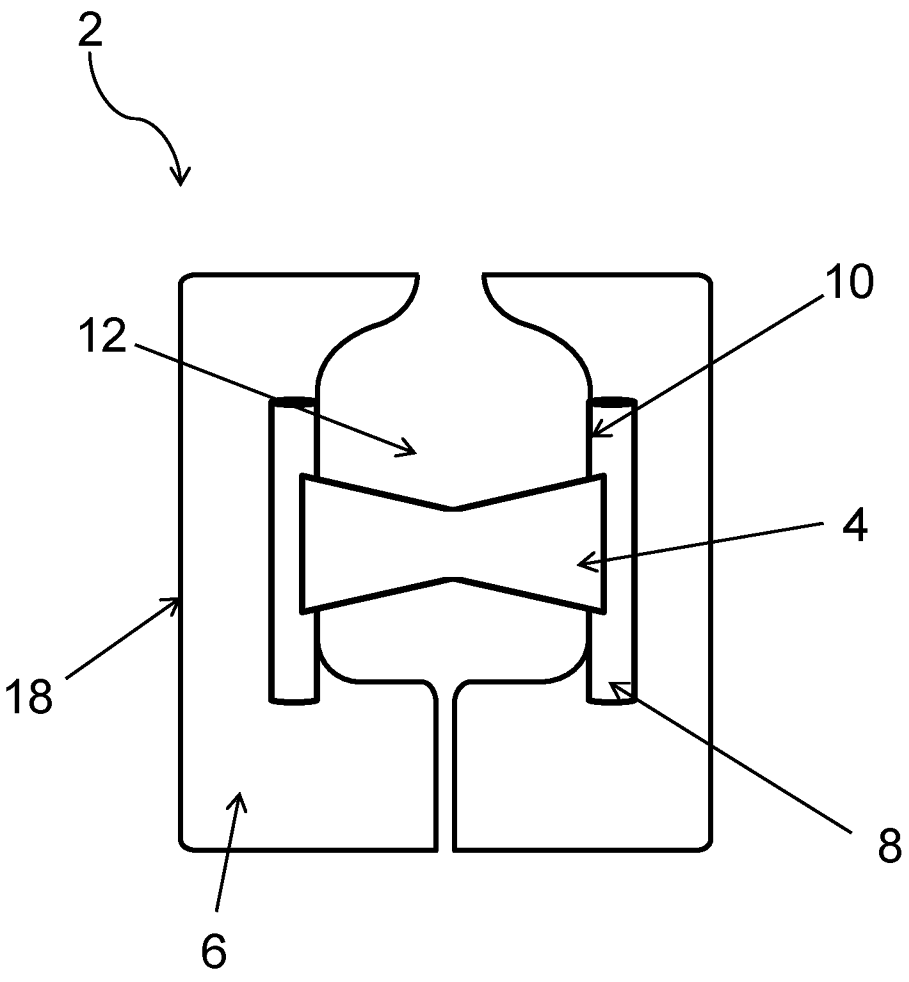
FIG. 2 is a schematic cross-section of an aerosol generating device according to a second embodiment of the invention.

FIG. 2 shows a schematic cross-sectional view of an aerosol generating device 2 in a second embodiment of the invention which comprises a heating element 4, a liquid store 6, liquid transport elements 8 and a housing 10. The skilled person will recognise that the description of the previous embodiment may also apply to this second embodiment.

In this embodiment, the heating element 4 is suspended across a portion of the air flow channel 12 and is held in place by the liquid transport elements 8 as well by contact point of the housing 10. Similarly to the previous embodiment, the heating element 4 is in fluid communication with the liquid store 6 via capillary action of the liquid transport elements 8. More specifically, the ends of the heating element 4 are in contact with the liquid transport elements 8 which are in contact with the liquid store 6 and the aerosol generating liquid held within the liquid store 6. When the heating element 4 has wicking properties, for example if it comprises a mesh of electrically conducting fibres, it can transport liquid from the liquid transport elements 8 along itself. Arranging the components in this manner provides a compact capsule design for the aerosol generating device 2.

In a preferred embodiment, the heating element 4 is shaped such that the width (and/or the thickness) of the heating element 4 decreases as the distance from the liquid transport element 8 increases. This creates areas of different current density across the heating element 4; with a relatively high current density near the centre of the heating element 4 and a relatively low current density near the ends of the heating element 4. In use, areas of relatively high current density will become hotter than areas of relatively low current density, thus establishing a temperature gradient across the heating element 4. This ensures that the highest temperature regions of the heating element 4 are furthest away from the liquid transport elements 8, reducing the effect of temperature degradation on the liquid transport elements 8.

As is shown in FIG. 2, the heating element 4 is arranged such that the plane of the heating element 4 is substantially parallel to the direction of air flow through the air flow channel 12. This arrangement reduces turbulence caused by the heating element 4 to the air flow through the air flow channel 12. In alternative embodiments, the heating element 4 may be arranged such that the plane of the heating element 4 is angularly offset or perpendicular to the direction of air flow through the air flow channel 12 in order to customise the smoking experience of the user and provide a more compact design.

Figure 3:
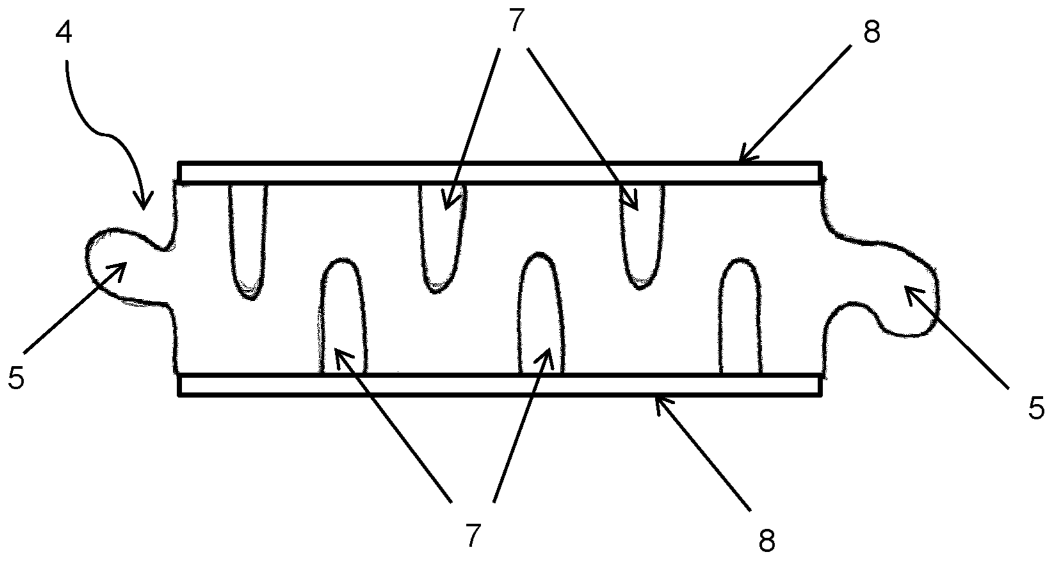
FIG. 3 is a schematic top view of a heating element and liquid transport elements in a third embodiment of the invention.

FIG. 3 shows a schematic top view of the heating element 4 and liquid transport elements 8 in a third embodiment of the invention. The heating element has two contact ends 5 which may be connected to a power source (not shown). In use, an electric current passes through the heating element 4 to generate heat. The heating element 4 also includes a plurality of slots 7, which are arranged to cause an electric current to follow a meandering or serpentine path as it flows between the two contact ends 5, resulting in different concentrations of current along the path. In alternative arrangements, the heating element 4 may comprise a simple shape, such as a rectangle, and different current concentrations may be established across the heating element 4 by alternative means. In this embodiment there is a liquid transport element 8 arranged along the length of each side of the heating element 4 to transport liquid from the surrounding liquid store 6 (not shown) to the heating element 4. By ensuring that the liquid transport element 8 is sufficient distance from the hottest regions of the heating element 4, the temperature degradation of the liquid transport element 8 may be avoided.

Figure 4:
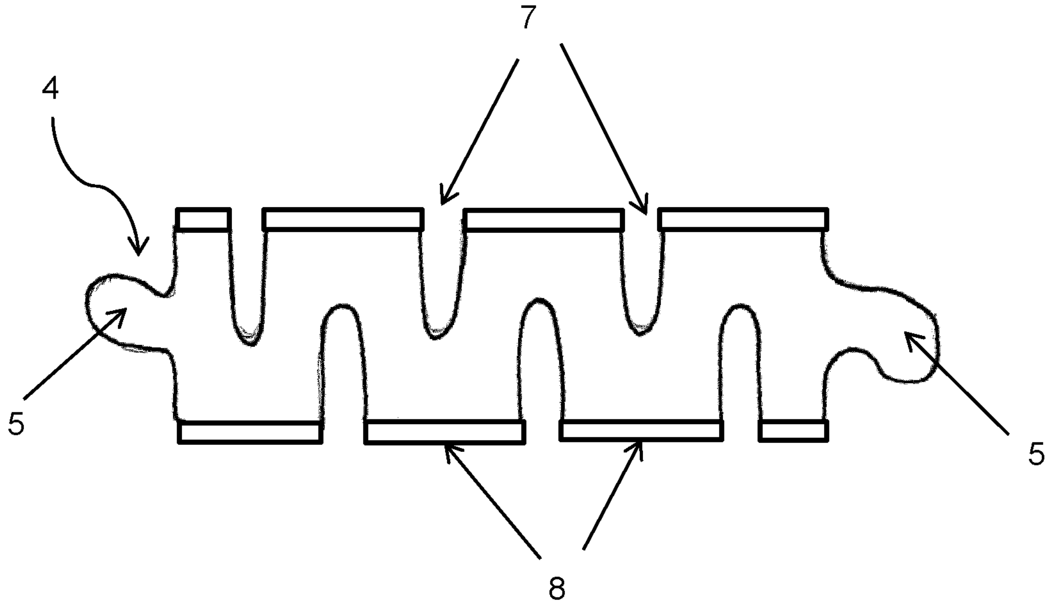
FIG. 4 is a schematic top view of a heating element and liquid transport elements in a fourth embodiment of the invention.

FIG. 4 shows a schematic top view of the heating element 4 and liquid transport elements 8 in a fourth embodiment of the invention. Similar to the previous embodiment, the heating element 4 comprises a plurality of slots 7 which cause different concentrations of current between the two contact ends 5. However, in this embodiment, the liquid transport elements 8 are not continuous across the length of the side of the heating element 4. Instead, liquid transport elements 8 with shorter lengths are arranged in sections along the edges of the heating element 4 such that they do not extend between the slots 7 in the heating element 4. In some arrangements, the gaps between the liquid transport elements 8 located nearby the openings of the slots 7 may be covered by portions of the housing 10 (not shown) to prevent aerosol generating liquid from contacting the heating element 4 without having been transferred to the heating element 4 by a liquid transport element 8.

Figure 5:
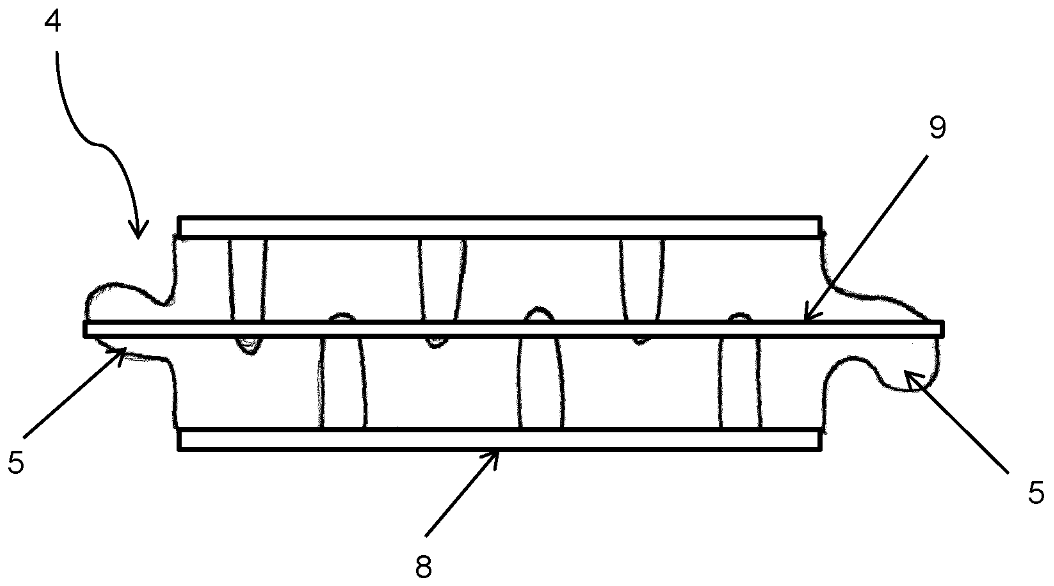
FIG. 5 is a schematic top view of a heating element and liquid transport elements in a fifth embodiment of the invention.

FIG. 5 shows a schematic top view of the heating element 4 and liquid transport elements 8 in a fifth embodiment of the invention. Similar to the embodiment of FIG. 3, the liquid transport elements 8 are arranged along the length of each side of the heating element 4 to transport liquid from the surrounding liquid store 6 (not shown) to the heating element 4. However, in this embodiment the aerosol generating device further comprises a heating rod 9 arranged across the heating element 4. The heating rod 9 has a higher electrical conductivity than the heating element 4 and is configured to receive electrical energy from the power source in order to provide a central region of high current density and heat. Contact between the heating element 4 and the heating rod 9 allows electrical and heat conduction to pass between the two components. Fixing the heating rod 9 to the heating element 4 also provides further structural stability to the mesh to prevent breakage and prolong the lifetime of the heating element 4 when applied in a device. Furthermore, though the embodiment of FIG. 3 only shows a single heating rod 9, the skilled person will recognise that a plurality of heating rods could be introduced. For example, on both sides of the heating element 4 to more evenly distribute heat throughout the heating element 4.

In alternative embodiments, the heating rod 9 may be angled so as follow the meandering path between the contact ends 5 of the heating element 4. Instead of the heating rod 4, a single solid wire (or a bundle of wires) may be arranged on the heating element 4 or through the mesh.

Figure 6:
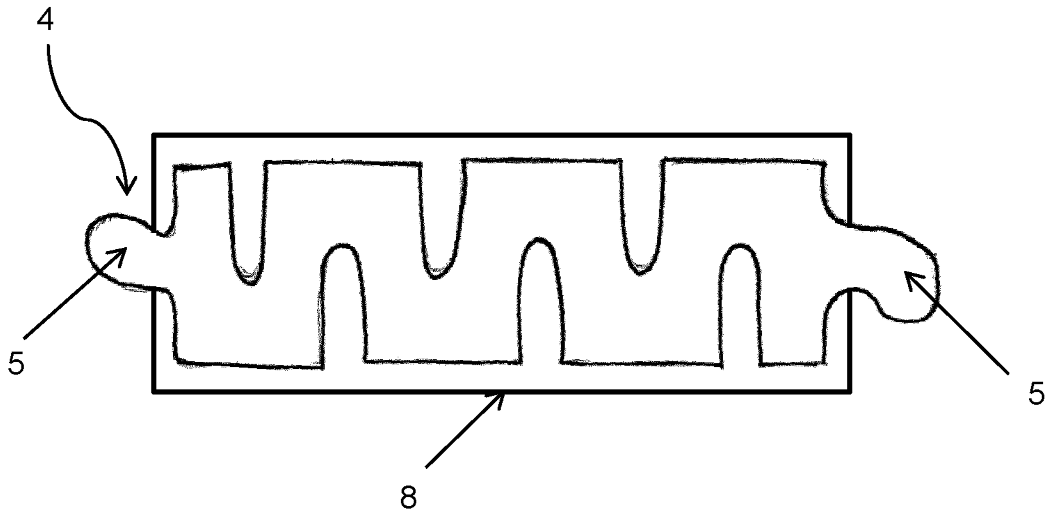
FIG. 6 is a schematic top view of a heating element and liquid transport element in a sixth embodiment of the invention.

FIG. 6 shows a schematic top view of a heating element 4 and liquid transport element 8 in a sixth embodiment of the invention, wherein the heating element 4 is arranged on the liquid transport element 8. The increased area of contact between the heating element 4 and liquid transport element 8 can facilitate faster transport of aerosol generating liquid onto the heating element 4, due to the greater degree of wicking available. Configuring the heating element 4 and liquid transport element 8 in this manner allows for the aerosol generating device to be provided in a compact configuration. Preferably, the regions of the heating element 4 that are not in contact with the liquid transport element 8 are uncovered within an air flow channel 12, such that aerosol generated by heating aerosol generating liquid on the heating element 4 will be carried along the air flow channel 12 to exit the device. The contact ends 5 of the heating element 4 may protrude over the edges of the liquid transport element 8.

In alternative embodiments, the heating element 4 may be partially embedded within the liquid transport element 8 to provide a further increased area of contact between the heating element 4 and the liquid transport element 8. The heating element 4 should not be completely embedded within the liquid transport element 8 in order to allow aerosol that is generated to pass through an air flow channel 12. Alternatively, the liquid transport element 8 may be shaped such that regions of the heating element 4 are exposed to the air flow channel 12.

The invention claimed is:

1. An aerosol generating device comprising:
a planar heating element comprising a mesh of electrically conductive fibres;
a heating rod in contact with a central portion of the planar heating element to provide a central region of high current density, thereby providing a temperature gradient across the planar heating element during use;
a liquid store; and
a liquid transport element arranged between the liquid store and the planar heating element and configured to transport liquid from the liquid store to the planar heating element under capillary action during use;
wherein the liquid transport element is arranged in contact with an edge portion of the mesh.

2. The aerosol generating device according to claim 1, wherein the planar heating element is configured to transport liquid by capillary action in use.

3. The aerosol generating device of claim 1, wherein the liquid transport element comprises a first wicking material and a second wicking material, wherein the first wicking material has a higher resistance to thermal degradation than the second wicking material.

4. The aerosol generating device of any preceding-claim 1, wherein the liquid transport element comprises ceramic material and the mesh is arranged on or embedded in the ceramic material such that liquid is transported to the mesh through the ceramic material.

5. The aerosol generating device according to claim 1, wherein the liquid transport element is in contact with a plurality of contact portions of the mesh.

6. The aerosol generating device of claim 1, further comprising:

a heater housing arranged to hold the planar heating element within the heater housing, wherein the heater housing comprises a gap arranged to allow a liquid to pass from the liquid store into the heater housing; wherein the liquid transport element is arranged within gap in the heater housing.

7. The aerosol generating device according to claim 1, wherein the liquid transport element comprises a porous or fibrous material.

8. The aerosol generating device of claim 7, wherein the liquid transport element comprises cotton or a ceramic.

9. The aerosol generating device according to claim 1, wherein the planar heating element comprises slots extending inwardly from an edge of the planar heating element.

10. The aerosol generating device according to claim 9, wherein the slots are arranged such that the planar heating element comprises a square wave shape.

11. The aerosol generating device according to claim 1, further comprising:

a tubular heater housing having one or more longitudinal gaps running along a length of the heater housing; wherein the liquid store surrounds the tubular heater housing;

the planar heating element runs axially through the tubular heater housing; and one or more liquid transport elements are positioned within the one or more longitudinal gaps and arranged to transport liquid from the liquid store through the one or more longitudinal gaps in the tubular heater housing to the planar heating element.

12. The aerosol generating device according to claim 11, wherein the one or more liquid transport elements are arranged to fill the one or more longitudinal gaps.

* * * * *